Aug. 8, 1950     W. R. GOSS ET AL     2,518,138
SWITCH FOR SPEED REGULATORS
Filed Oct. 18, 1947                                    2 Sheets—Sheet 1
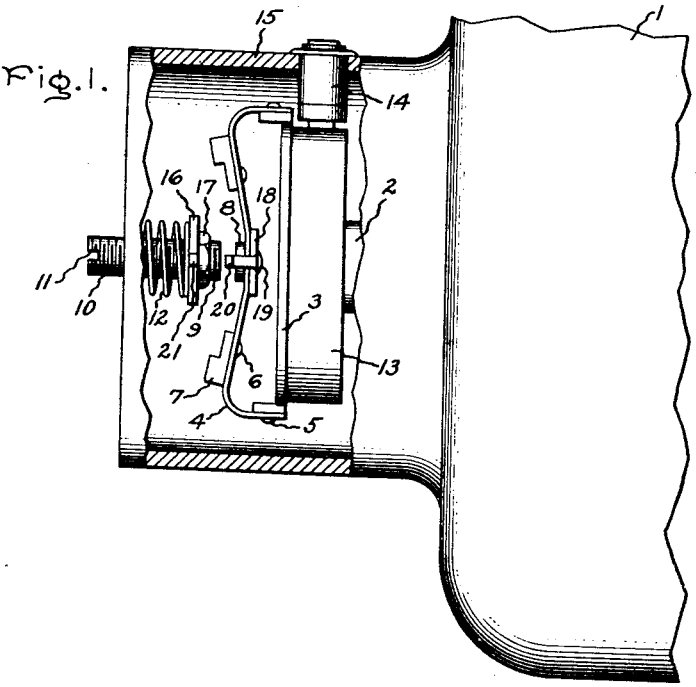
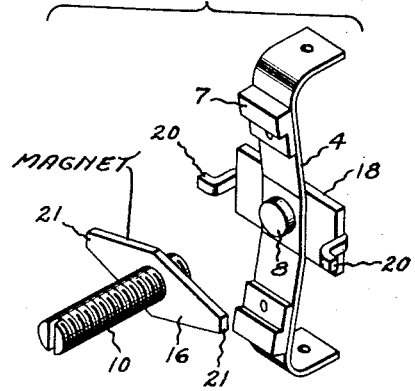
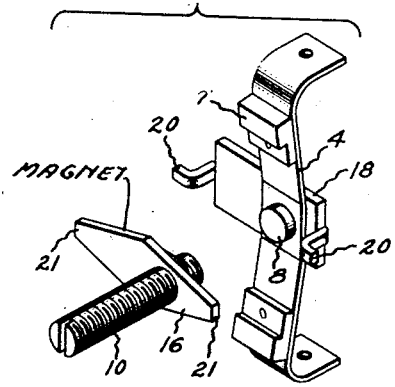
Inventors:
Wesley R. Goss,
Henry C. Roemke,
by Purnell S. Mack
Their Attorney.

Aug. 8, 1950  W. R. GOSS ET AL  2,518,138
SWITCH FOR SPEED REGULATORS
Filed Oct. 18, 1947  2 Sheets-Sheet 2
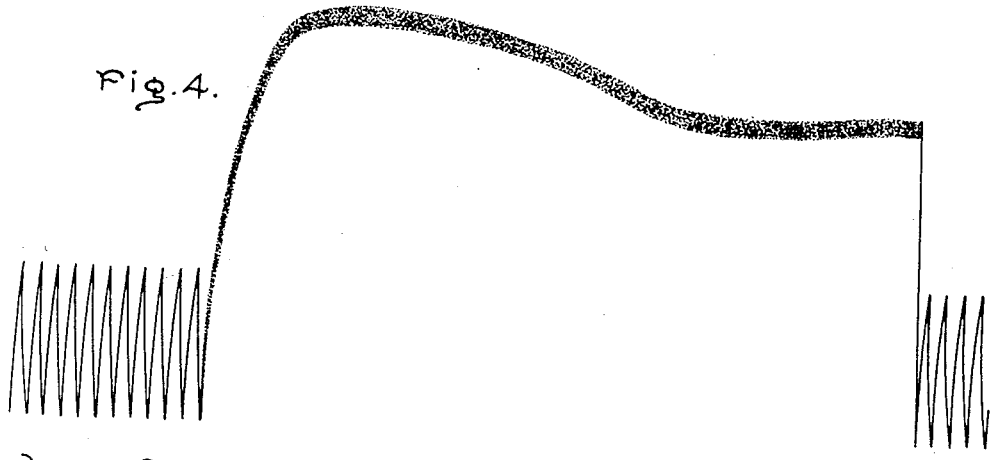
Fig. 4.
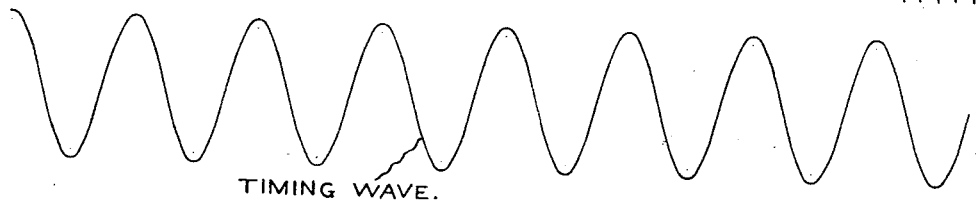
TIMING WAVE.
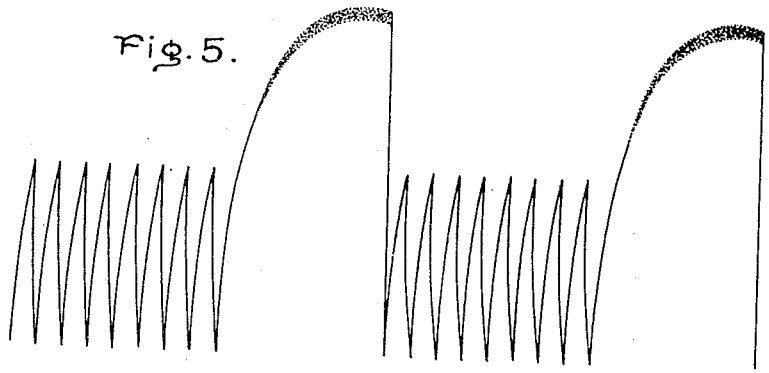
Fig. 5.
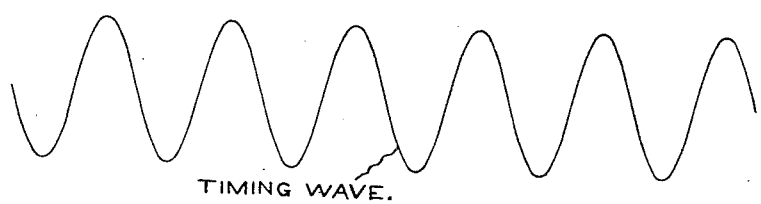
TIMING WAVE.
Inventors:
Wesley R. Goss,
Henry C. Roemke,
by Crowell P. Mack
Their Attorney.

Patented Aug. 8, 1950

2,518,138

UNITED STATES PATENT OFFICE 2,518,138

SWITCH FOR SPEED REGULATORS

Wesley R. Goss and Henry C. Roemke, Fort Wayne, Ind., assignors to General Electric Company, a corporation of New York Application October 18, 1947, Serial No. 780,624

5 Claims. (Cl. 200—80)

This invention relates to speed regulators for electric motors and more particularly to speed regulators of the centrifugally operated type.

Centrifugal speed regulators used to regulate the speed of electric motors are normally connected to the control circuits so that when the connector contacts are closed the motor operates at one speed and when they are open the motor operates at a different speed, the ratio of time open to time closed determining the mean speed of the motor.

A well known form of centrifugal speed regulator is the "center contact" type, as shown in Patent 2,311,409 to Frank W. Merrill, assigned to the assignee of this application. In this type of regulator there is provided a rotatable member carrying a contact mounted concentrically with its axis of rotation, this contact being actuated by centrifugal weights to move in an axial direction. The axially movable center contact cooperates with a fixed contact for opening and closing the speed control circuit of the motor. The position of the fixed contact is usually adjustable so as to provide adjustment of the speed setting of the motor.

In many applications, it is necessary to hold the speed of the motor particularly constant. In order to accomplish this objective, the centrifugal governor must have a steady vibratory action with the contacts being opened and closed at a steady rate. If there is any deviation from this steady rate of opening and closing, excessive surges in the input current to the motor will result. These surges are comparable to a superposition of alternating current on the direct current input of the motor and cause excessive variations in speed, abnormal losses, and poor commutation. It is, therefore, desirable to provide a centrifugal speed regulator in which the vibratory action is stabilized to prevent these objectionable surges.

An object of this invention is to provide an improved motor speed regulator.

Another object of this invention is to provide improved means for stabilizing centrifugal speed regulators.

Further objects and advantages of this invention will become apparant and this invention will be better understood from the following description taken in connection with the accompanying drawings. The scope of this invention will be pointed out with particularity in the claims annexed to and forming a part of this specification.

It has been found that the undesirable operation of centrifugal speed regulators can be eliminated by providing means for positively engaging the regulator contacts at least once every revolution of the regulator. A feature of this invention is the provision of a permanent magnet mounted on one of the contacts which cooperates with an iron armature on the other contact. This magnet and its associated armature are so proportioned that the regulator contacts are caused to close, irrespective of speed, at least once every revolution.

Fig. 1 is a side elevational view of a motor provided with a centrifugal speed regulator constructed in accordance with this invention, Fig. 2 is a detailed view of the magnet and armature of one embodiment of this invention, Fig. 3 is a detailed view of the magnet and armature of the preferred embodiment of this invention, Fig. 4 shows an oscillogram illustrating the voltage surge produced by a conventional center contact regulator, and Fig. 5 is an oscillogram showing the improvement produced by utilizing the speed regulator of this invention.

Referring now to Fig. 1, there is shown a motor 1 having a rotatable shaft 2 to which is connected a rotatable member 3. Mounted on the rotatable member is a transversely flat longitudinally curved spring member 4 which may be formed of suitable spring material. The ends of this spring are fastened to the outer periphery of the rotatable member 3 by any suitable means, such as rivets 5, in such a way that the spring extends across the axis of rotation of the rotatable member on a diameter thereof. The spring member 4 is curved inwardly in a general concave form. Fastened to the spring by any suitable means, such as rivets 6, are centrifugal actuating weights 7 located near the ends of the spring on opposite sides of its center. Carried at the center of the spring and mounted concentric with respect to the axis of rotation is a center contact 8. This contact cooperates with a normally fixed but axially adjustable contact 9 which is carried on the end of a threaded screw 10. The screw 10 is slotted, as at 11, to permit axial adjustment of the contact, and spring member 12 is provided to tend to move the contact 9 toward contact 8 thereby insuring that the contact will stay in position when once adjusted and will not change position due to vibration. Electric connections are made to the center contact 8 through the spring 4 by means of a collector ring 13 and a brush assembly 14 carried by the speed regulator housing 15.

In order to stabilize the operation of the regulator, the arrangement now to be described is provided. A permanent magnet member 16 is secured to the stationary contact 9 and is held in place by spring 12 and nut 17. A soft iron armature member 18 is secured to the movable contact 8, both contact and armature members being secured to the spring 4 by a rivet 19. This armature member is provided with poles or tips 20 extending toward the tips 21 of the stationary magnet 16.

Referring now to Fig. 2, it will be noted that the tips 21 of the magnet 16 and the corresponding poles 20 of the armature member are narrow in a circumferential direction. This was done in order to shorten the percentage duration of the magnetic impulse, it having been found that the best performance is obtained if the regulator is allowed to operate freely most of the time. The magnetic pull which closes the contacts needs to be applied only for a short interval to effect stabilization and to prevent low frequency hunting, a defect frequently found in purely mechanical regulators. If the magnetic pull is made to last for a longer time, the regulation is interfered with and the contact wear is greatly increased by the imposition of contact pressures greater than those obtained in free regulator operation. An optimum timing of the magnetic impulse was found to be approximately 10% of a revolution. The embodiment of Fig. 2, is adapted to receive two magnetic impulses per revolution, and therefore, each magnetic impulse would be approximately 10% of a revolution, there being two such 10% impulses for each revolution of the rotatable member.

Referring now to Fig. 3 there is shown a preferred modification which is adapted for one magnetic impulse for each revolution. In this embodiment, the magnet member 16 and the armature member 18 are mounted eccentrically thus giving one attractive pull to close the contacts once for every revolution. In this case, there would be one 10% impulse for each revolution.

It will now be seen that the spring and centrifugal weight assembly provides a primary means for causing a steady vibratory engagement and disengagement of the regulator contacts, while the magnet and armature assembly provides a means for insuring the engagement of the contacts at least once every revolution to effect stabilization of the regulator. Additional advantages of this invention are the fact that the regulator action is not impaired by wearing of the contacts and the fact that the contact material may be fully used before a replacement becomes necessary.

It has been found that with the preferred embodiment of Fig. 3, satisfactory operation of a regulator applied to a fractional horsepower frame size motor was obtained with a range of magnet gap from .10" to .020". During tests of a motor generator set with a centrifugal center contact regulator of the standard type used with the motor, there was excessive speed oscillation which caused an undesirable fluctuation in the generator output. The tests showed that the voltage across the regulator varied from 26.5 to 33 volts at no load and from 32 to 36 volts at full load. With the magnetic impulse regulator of Fig. 3, the same contacts being used, the voltage varied from 27 to 27.5 at no load and from 35.5 and 35.6 at full load, the set operating smoothly and the output voltage being steady.

Referring now to Fig. 4, there is shown an oscillogram of the voltage across the governor contacts of a conventional centrifugal center contact regulator which is not provided with the magnet and armature members of this invention. This is compared with a 60 cycle timing wave. This oscillogram was taken on a motor generator set operating at 1150 R. P. M. This set has a bad low frequency hunt which caused the regulator voltage and the input current of the motor to surge. The oscillogram of Fig. 4 shows that during this surge, the regulator contacts were actually open for about two revolutions. This characteristic was also reflected in the generator output which had a constant low frequency oscillation.

A very pronounced improvement was produced by application of the magnet and armature of this invention as shown in the oscillogram of Fig. 5. This oscillogram also shows the voltage across the contacts of the regulator of Fig. 3 compared with a 60 cycle timing wave. This oscillogram, made under the same conditions of load and voltage as Fig. 4, with the magnetic impulse regulator of Fig. 3, shows one interruption for each revolution with the regulator vibrating at its natural frequency for the remainder of the revolution. This interruption stops the low frequency hunt, thus permitting the unit to operate at a uniform speed and to generate a smooth output voltage.

It will now be apparent that this invention provides an improved speed regulator of the centrifugal type. It is to be understood that the magnet and armature assembly of this invention can be equally well applied to stabilize forms of regulators other than that shown here. It will also be apparent that the relative positions of the magnet and the armature members can be interchanged without materially affecting the operation of the device.

While we have illustrated and described particular embodiments of our invention, modifications thereof will occur to those skilled in the art. We desire it to be understood, therefore, that our invention is not to be limited to the particular arrangements disclosed, and we intend in the appended claims to cover all modifications which do not depart from the spirit and scope of our invention.

What we claim as new and desire to secure by Letters Patent of the United States is:

1. In a speed regulator for an electric motor, a rotatable member on the shaft of said motor, a pair of contacts, means responsive to the speed of said rotatable member adapted to cause engagement and disengagement of said contacts for regulating the speed of said motor, and means including a magnet on one contact adapted to cause engagement of said contacts at least once every revolution of said rotatable member in addition to the engagement caused by said speed responsive means for stabilizing the action of said regulator.

2. In a speed regulator for an electric motor, a rotatable member on the shaft of said motor, a pair of contacts, means responsive to the speed of said rotatable member adapted to cause engagement and disengagement of said contacts for regulating the speed of said motor, and means including a magnet positioned on one contact and an armature positioned on the other contact adapted to cause engagement and disengagement of said contacts at least once every revolution of said rotatable member in addition to the engagement caused by said speed responsive means for stabilizing the action of said regulator.

3. In a speed regulator for an electric motor, a rotatable member on the shaft of said motor, a pair of contacts, means responsive to the speed of said rotatable member adapted to cause engagement and disengagement of said contacts for regulating the speed of said motor, and means including a magnet positioned on one contact and an armature positioned on the other contact adapted to cause engagement of said contacts in addition to the engagement caused by said speed responsive means, said magnet being mounted so that said contacts are engaged twice for every revolution of said rotatable member for stabilizing the action of said regulator.

4. In a speed regulator for an electric motor, a rotatable member on the shaft of said motor, a pair of contacts, means responsive to the speed of said rotatable member adapted to cause engagement and disengagement of said contacts for regulating the speed of said motor, and means including a magnet mounted on one contact and an armature mounted on the other contact adapted to cause engagement of said contacts in addition to the engagement caused by said speed responsive means, said magnet being mounted eccentrically whereby said magnet causes engagement of said contacts once every revolution of said rotatable member for stabilizing the action of said regulator.

5. In a centrifugal speed regulator for an electric motor, a rotatable member on the shaft of said motor, a pair of contacts, centrifugal means on said rotatable member and responsive to the speed thereof adapted to move one contact toward the other contact to cause engagement and disengagement of said contacts for regulating the speed of said motor, and magnet means adapted to cause engagement of said contacts at least once every revolution of said rotatable member in addition to the engagement caused by said centrifugal means for disturbing the normal action of said regulator whereby friction and low frequency hunting are reduced.

WESLEY R. GOSS.
HENRY C. ROEMKE.

REFERENCES CITED

The following references are of record in the file of this patent:

UNITED STATES PATENTS

| Number | Name | Date |
|---|---|---|
| 1,870,032 | Young et al. | Aug. 2, 1932 |
| 2,178,839 | Landon | Nov. 7, 1939 |
| 2,311,409 | Merrill | Feb. 16, 1943 |
| 2,323,910 | Hubbell | July 13, 1943 |
| 2,456,979 | Merrill | Dec. 21, 1948 |